(No Model.) 4 Sheets—Sheet 1.

F. W. KALLUSCH & F. M. JURUICK.
SOLE ROUNDING MACHINE.

No. 543,304. Patented July 23, 1895.

Witnesses
Jas. K. McCathran

Inventors
Frederich W. Kallusch
Frederich M. Juruick
By their Attorneys,
C. A. Snow & Co.

(No Model.) 4 Sheets—Sheet 2.

F. W. KALLUSCH & F. M. JURUICK.
SOLE ROUNDING MACHINE.

No. 543,304. Patented July 23, 1895.

Witnesses
Jas. K. McCathran

Inventors
Frederick W. Kallusch
Frederick M. Juruick
By their Attorneys
C. A. Snow & Co.

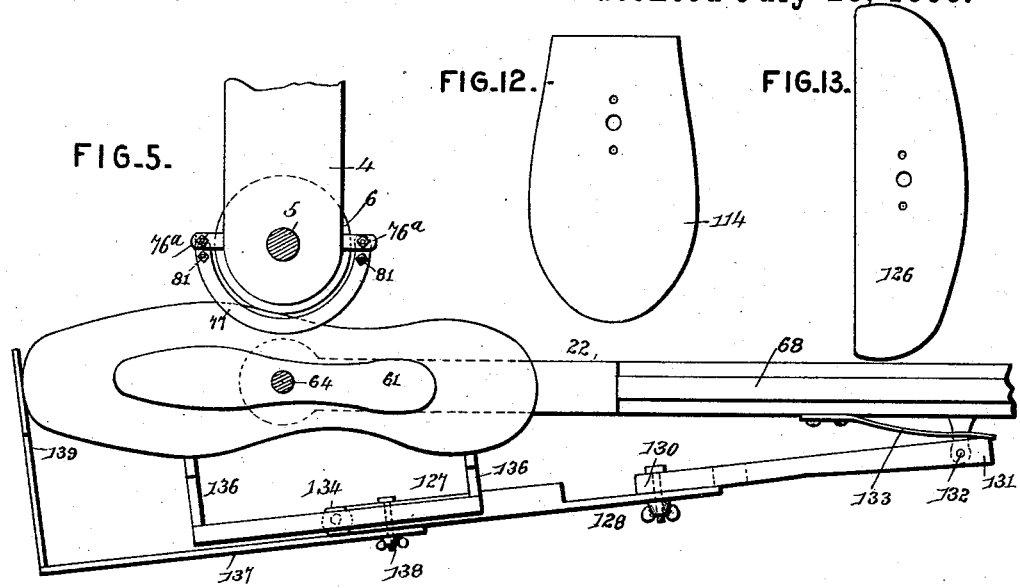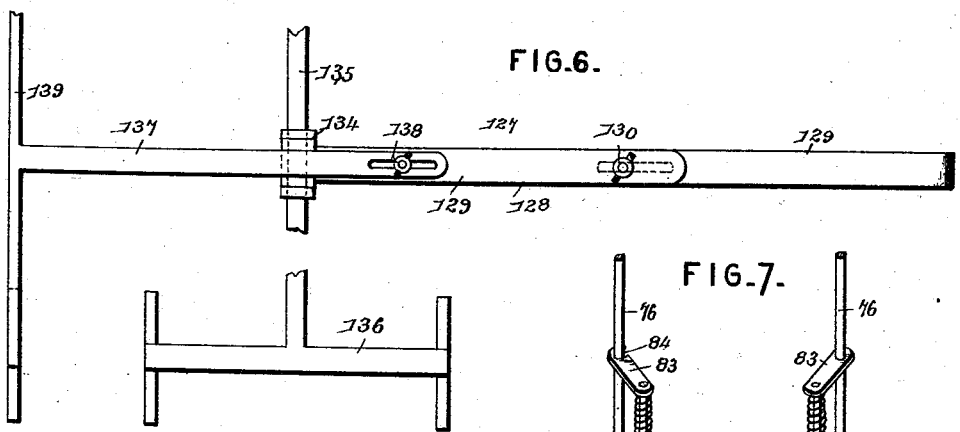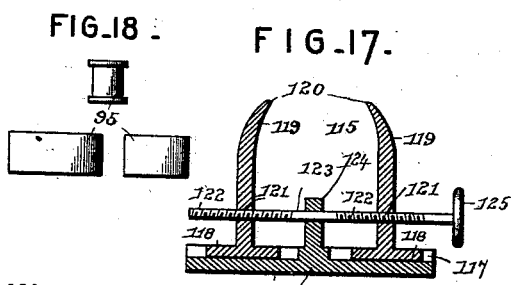

(No Model.) 4 Sheets—Sheet 4.

F. W. KALLUSCH & F. M. JURUICK.
SOLE ROUNDING MACHINE.

No. 543,304. Patented July 23, 1895.

Witnesses
Jas. K. McCahran
L. P. Whauptt

Inventors
Frederick W. Kallusch
Frederick M. Juruick
By their Attorneys, C. A. Snow & Co.

UNITED STATES PATENT OFFICE.

FREDERICK W. KALLUSCH AND FREDERICK M. JURUICK, OF ROCHESTER, NEW YORK.

SOLE-ROUNDING MACHINE.

SPECIFICATION forming part of Letters Patent No. 543,304, dated July 23, 1895.

Application filed June 11, 1894. Serial No. 514,259. (No model.)

*To all whom it may concern:*

Be it known that we, FREDERICK W. KALLUSCH and FREDERICK M. JURUICK, citizens of the United States, residing at Rochester, in the county of Monroe and State of New York, have invented a new and useful Sole-Rounding Machine, of which the following is a specification.

This invention relates to sole and heel rounding and finishing machines; and it has for its object to effect certain improvements in machines of this character whereby leather soles and heels and wooden heels may be accurately cut out and finished off in different sizes, shapes, and styles.

To this end the main and primary object of the present invention is to provide a sole and heel rounding and finishing machine whereby a complete sole-blank, including a heel, can be cut or rounded out at one revolution of the shaft carrying the blanks and the pattern, and also to provide means whereby the heels and half-soles may be cut or rounded out separately at a half-revolution of the shaft carrying the blanks.

Furthermore, the invention contemplates simple and improved means for utilizing a single pattern capable of a great variety of adjustments for forming soles and heels of different sizes, shapes, and styles; and a further object may be stated to be to provide a machine of the character noted that can be quickly and readily adjusted for buffing, scouring, and other finishing purposes.

With these and many other objects in view, which will readily appear as the nature of the invention is better understood, the same consists in the novel construction, combination, and arrangement of parts hereinafter more fully described, illustrated, and claimed.

Figure 1:
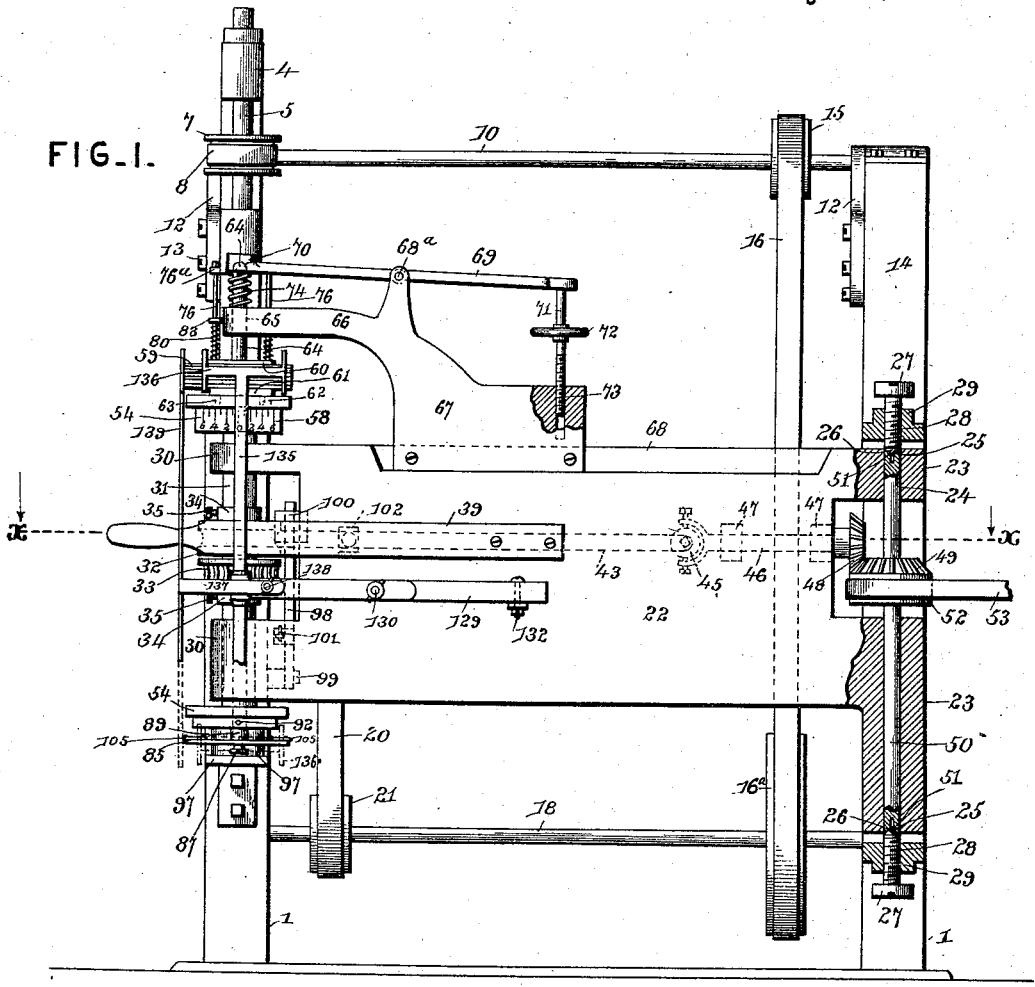
Figure 3:
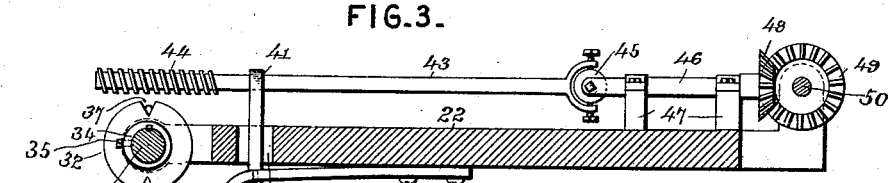
Figure 4:
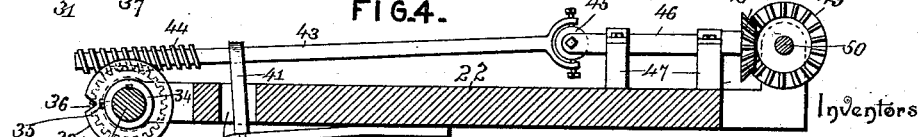
Figure 2:
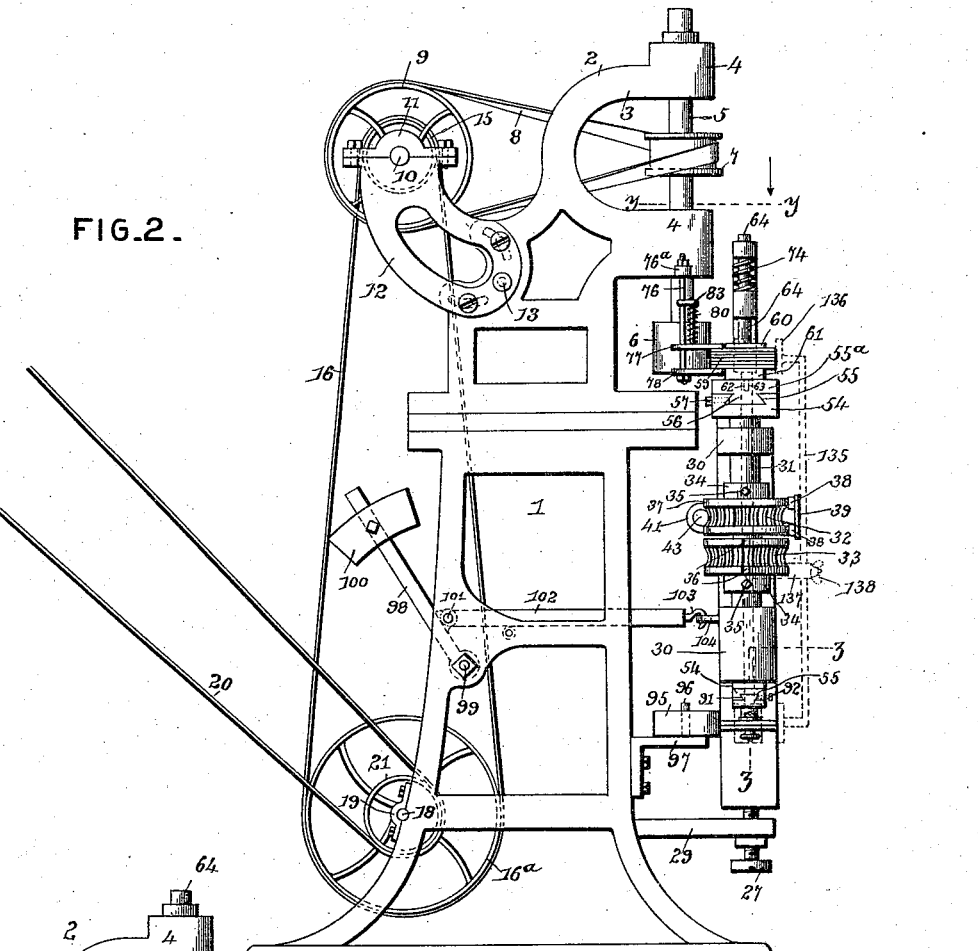
Figure 15:
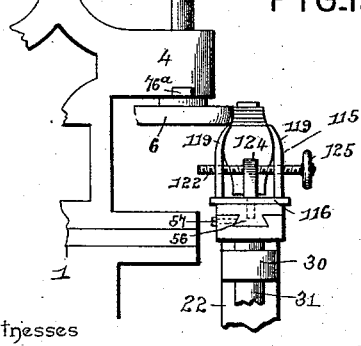
Figures 14, 16:
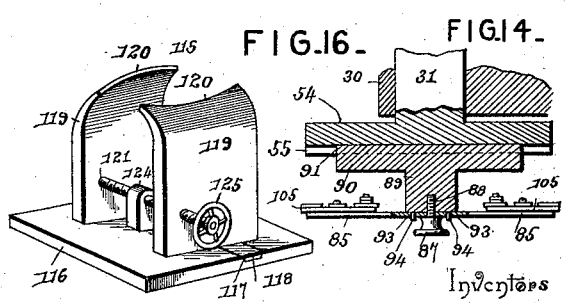
Figure 8:
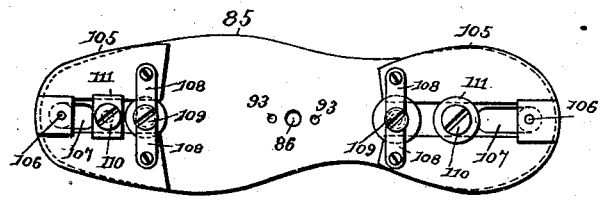
Figure 10:
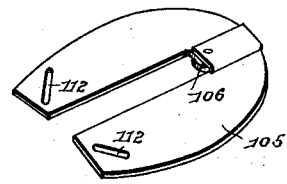
Figure 9:
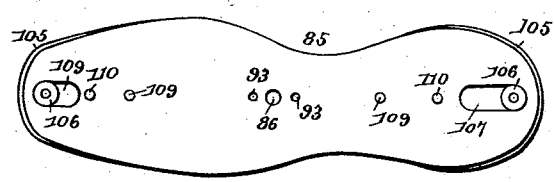
Figure 11:
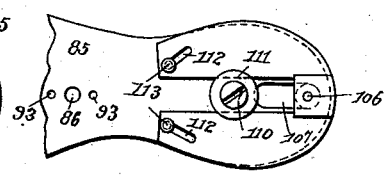

In the accompanying drawings, Figure 1 is a front elevation of a machine constructed in accordance with this invention. Fig. 2 is an end view thereof. Fig. 3 is a detail horizontal sectional view of the side arm on the line $x\,x$ of Fig. 1, showing the adjustable worm out of engagement with one of the worm-gears. Fig. 4 is a similar view showing the adjustable worm in gear with the other one of the worm-gears. Fig. 5 is a detail sectional view on the line $y\,y$ of Fig. 2. Fig. 6 is a detail side elevation of the lower portion of the gage-frame shown in Fig. 5. Fig. 7 is a detail in perspective of the segmental edge-clamp for the sole-blank. Fig. 8 is a top plan view of the complete sole-pattern with the adjustable heel and toe plates thereon. Fig. 9 is a bottom plan view of the sole-pattern. Fig. 10 is a detail in perspective showing a modification of the adjustable heel-plates for the pattern. Fig. 11 is a similar view showing the modified form of the heel-plates arranged on the heel of the sole-pattern. Fig. 12 is a detail plan view of a separate heel-pattern. Fig. 13 is a similar view of the heel-stiffening strip-pattern. Fig. 14 is a detail sectional view on the line $z\,z$ of Fig. 2, showing the detachable connection of the pattern to the lower end of the vertical table-shaft. Fig. 15 is a detail end view of the upper portion of the machine, showing the modified arrangement for clamping a shoe with the heel built thereon for the purpose of shaping and finishing off the heel. Fig. 16 is a detail in perspective of the clamp shown in Fig. 15. Fig. 17 is a detail sectional view of the clamp shown in Fig. 16. Fig. 18 is a detail elevation of a series of different sized pattern-rollers. Figs. 19 to 25, inclusive, illustrate the different sizes, shapes, and styles provided for by a single pattern-plate.

Referring to the accompanying drawings, 1 designates a machine frame or stand constructed in any suitable substantial manner and supporting thereon at one end the spindle-frame 2. The spindle-frame 2 is provided with a bifurcated portion 3, at the upper and lower extremities of which are arranged the bearing-collars 4, in which is journaled the upright cutter-spindle 5, to the lower end of which, below the lower of said bearing-collars, is adapted to be detachably connected an ordinary rotary cutter 6 of a suitable size and shape to adapt the same for the particular work required of it. The said vertical cutter-spindle 5 has mounted thereon, between the bearings 4, the flanged belt-pulley 7, over which passes one end of the belt 8, the other end of which passes over the belt-wheel 9, mounted on the counter drive-shaft 10.

The counter drive-shaft 10 is journaled in aligned bearing-boxes 11 at the upper outer end of the offstanding bearing-brackets 12, adjustably secured at their inner ends, as at 13, to the spindle-frame 2 and to the bracket-support 14 at one end of the machine frame or stand, respectively, and the adjustable connection of the said bearing-brackets 12 with their supports provides means for properly adjusting the tension of the several belts. The counter drive-shaft 10 also has mounted thereon the pulley 15, over which passes the upper end of the belt 16, that receives its motion from the belt-wheel 16ª, on the main drive-shaft 18, journaled in suitable bearing-boxes 19 at one side of the machine frame or stand and given motion from the drive-belt 20, passing over the belt-wheel 21, also mounted on the said drive-shaft.

The gearing connections just described provide means for transmitting motion to the rotary cutter 6, which is arranged to work slightly above and at the front side of the machine frame or stand, and the stock or blanks are adapted to be rotated in contact with the said cutter 6, for the purpose of cutting or rounding the same out to the desired shape, size, and style, and to accomplish this a swinging side arm 22 is supported for adjustment at the front side of the machine frame or stand 1 to and away from the cutter. The swinging side arm 22 is provided at one end with the opposed pivot-collars 23, that are provided with bearing openings or perforations 24 therein, and are respectively provided at the upper and lower ends of their bearing openings or perforations with the pointed pivot-sockets 25, that receive the bearing-points 26 of the pointed pivot-screws 27, arranged to work in threaded openings 28 in the outer ends of the offstanding bracket-arms 29, projected from the front side of the machine frame or stand, and by thus pivotally supporting one end of the side arm 22 it will be understood that the same may be readily swung to and away from the fixed cutter.

The pivoted or swinging side arm 22 is provided at the free end thereof with the vertically-aligned bearing-collars 30, in which is journaled the vertical table-shaft 31, to which a complete or half revolution is communicated by means of the separate upper and lower worm gear-wheels 32 and 33, respectively. Both of the worm gear-wheels 32 and 33 are feathered or keyed on the shaft 31, so as to slide thereon and rotate therewith, and said wheels are provided with projected collars or hubs 34, which receive the set-screws 35, for holding the wheels fast in their adjusted positions, and, as illustrated, one of the gear-wheels is provided in the upper and lower flanges thereof with a single set of lock-notches 36, and the other of said wheels is provided with two sets of diametrically-opposite lock-notches 37, and the lock-notches for either of said wheels are adapted to be engaged by the lock points or studs 38 of the spring-handle arm 39, secured fast at one end, as at 40, to the outside of the swinging side arm 22. The normal tension of the spring-handle arm 39 presses the lock points or studs 38 thereof against the peripheral flanges of the worm gear-wheel at one side of the same, so that they will automatically engage the lock-notches of such wheel when brought directly opposite the points or studs, and said spring-handle arm has connected thereto at an intermediate point one end of the link-bar 41, that passes through an opening 42 in the swinging side arm 22, and is connected at its other end to the adjustable worm-shaft 43. The adjustable worm-shaft 43 is arranged at the inner side of the side arm 22 and carries at one end the worm 44, that is adapted to mesh with either of the wheels 32 or 33. The worm-shaft 43 is connected at one end by a gimbal-joint 45 to one end of the short operating-shaft 46, journaled in suitable bearings 47, projected from the inner side of the side arm 22. The shaft 46 has mounted on the outer end thereof the beveled gear-wheel 48, meshing with a similar gear-wheel 49, mounted at an intermediate point on a vertical drive-shaft 50, that is journaled in the bearing openings or perforations of the collars 23, and is provided at its upper and lower extremities with the sockets 51, agreeing with the sockets 25, to complete the pivotal support for one end of the swinging side arm. A belt wheel or pulley 52 is also mounted on the shaft 50, adjacent to the wheel 49, to receive one end of a belt 53 for transmitting motion to the shaft 50, and through the gearing-connections described to the vertical table-shaft 31.

When the machine is in operation, assuming the worm gear-wheel with lock-notches at one point therein to be adjusted opposite the spring handle-arm 39, it will be understood that by releasing the lock point or studs of the handle arm from the notches in said wheel will at the same time cause the worm 44 to mesh with the threads or teeth of such wheel, which wheel will then make one complete revolution until the lock points or studs 38 engage the lock-notches 36. This complete revolution of the worm gear-wheel gives a complete revolution to the table-shaft, and therefore allows a complete sole to be cut or rounded out from the blank. By adjusting the wheel with the opposite sets of notches 37 to a position opposite the worm 44 and the spring handle-arm 39 the table-shaft can only make one-half of a revolution at a time, which will adapt the machine for cutting out a half-sole or a heel. When the lock points or studs 38 of the spring handle-arm spring into engagement with the notches of said worm-wheel, the worm 44 is thrown out of mesh with such wheel and prevents further rotation of the table-shaft.

The vertical table-shaft 31 is provided at its upper and lower ends above and below the bearing-collars 30 with the head-plates 54, provided therein with the dovetailed grooves 55, and the grooved head-plate 54 at the upper end of said table-shaft is adapted to support thereon for adjustment the rest-table 55ª. The rest-table 55ª is provided with a dovetailed tongue 56, arranged to slide in the groove of the upper head-plate 54, and may be held fast in any adjusted position therein by means of the set-screw 57 working through a threaded opening in the upper side of the upper head-plate 54 and impinging against the said tongue 56. The adjustment of the rest-table 55ª provides means for increasing or diminishing the size of the sole being cut by lengthening or shortening the same, and such adjustment may be accurately scaled by means of providing one side of the upper head-plate 54 with a suitable scale 58, as shown.

The rest-table 55ª is rotated with the vertical table-shaft 31, and is adapted to support and hold thereon the sole or heel blanks 59, that are adapted to be cut or rounded out, and such blanks are held clamped onto the table 55ª between the upper and lower clamp-plates 60 and 61, respectively, that are smaller in size and are somewhat of the same configuration as a shoe-sole, the lower of said plates 61 being preferably provided at its lower side with studs 62, adapted to engage in stud-openings 63 in the upper face of the said table, to provide means for preventing the lower clamp-plates from slipping on the table, but other suitable securing means may be employed. The upper of said clamp-plates 60 is mounted on the lower end of the clamp-spindle 64, arranged to work in the bearing-opening 65 at one extremity of the bracket-arm 66 of the adjustable clamp-head 67, that is arranged for adjustment on the slide-tongue 68 on the upper edge of the swinging side arm 22. The said adjustable clamp-head 67 has pivotally connected to the upper side thereof, as at 68ª, the adjustable clamp-lever 69, provided at one end with a socket 70, arranged to loosely bear on the upper rounded end of the spindle 64, and the other end of said clamp-lever 69 has connected thereto the upper end of the screw-rod 71, provided with a hand-wheel 72, and working in the threaded socket or opening 73 in the upper side of the adjustable head 67.

By adjusting the screw-rod 71 in one direction the upper clamp-plate 60 will be clamped tight on top of the stack of sole or heel blanks to be rounded out, and by adjusting the screw-rod in an opposite direction the lever 69 is relieved from the clamp-spindle 64, so as to leave the same free to be automatically lifted from above the blanks by means of the lifting-spring 74, coiled on the upper end of the said spindle above the bracket-arm 66.

While the stack of blanks is being rotated against the cutter by the table-shaft it is necessary to hold the edges of the blanks next to the cutter closely together to prevent the same from turning up or separating from each other, and thereby preventing the entire stack of blanks from being evenly cut, and to provide for this a segmental edge-clamp 75 is employed. The segmental edge-clamp 75 is supported in position at the front side of the rotary cutter 6 by means of the parallel supporting-rods 76, secured at their upper ends in the lugs 76ª, projected from opposite sides of the lower bearing-collar 4, so as to dispose the said rods at both sides of the cutter. One of the said rods 76 has pivotally connected thereto one end of a pair of segmental clamp-plates 77 and 78, respectively, which are provided at their opposite ends with the hooks 79, adapted to detachably engage the other supporting-rod 76, and provide means whereby the clamp-plates may be swung back and out of the way of the cutter when the machine may be used for shaping and finishing heels, for buffing, scouring, or other purposes. The upper of said segmental clamp-plates 77 is normally held pressed downwardly toward the lower of said plates 78 by means of the clamp-springs 80, arranged above said upper plate 77 on the guide-rods 81, passed through perforations 82 in the upper plate 77 and secured at their lower ends to the lower plate 78. The upper ends of said rods 81 are fitted to one end of the brace-plates 83, one of which is loosely connected to one of the supporting-rods 76 and the other of which is provided with a hook 84 at one end to detachably engage the other of said rods, so that the clamp may be entirely thrown out of the way of the cutter when desired. In operation the edges of the blanks 59, next to the cutter 6, in contact with which they are rotated, are held firmly clamped between the plates 77 and 78 of the segmental edge-clamp 75, and this arrangement positively insures the cutting or rounding out of the blanks alike.

The proper configuration, size, shape, and style are given to the blanks being cut or rounded out by means of a pattern-plate 85. The pattern-plate 85 is provided with a central screw-opening 86 to receive the clamping-screw 87 that passes therethrough and engages a threaded opening 88 in the attaching-stud 89, projected from the lower side of the adjustable stud-plate 90 that is provided with a dovetailed tongue 91, adjustably engaging the groove of the head-plate 54 at the lower end of the table-shaft 31. The head-plate 54 at the lower end of the table-shaft also accommodates a set-screw 92 that is adapted to impinge against the tongue 91 to hold the stud-plate 90 in any adjusted position, and it will of course be understood that there may or may not be a correspondence between the adjustment of the rest-table 55ª and the stud-plate 90, which carries the pattern, so that the blanks will be cut properly to the same or different shape as the pattern and to the size for which the pattern may be adjusted.

The pattern-plate 85 is also provided at both sides of the central screw-opening 86 therein with the stud-openings 93, that engage over the pins 94, projected from the lower ends of the attaching-stud 89, and this provides a connection which causes the pattern-plate to be positively rotated with the vertical motion-shaft 31. The said pattern-plate 85 is adapted to be held to rotate against the periphery of a pattern-roller 95. The pattern-roller 95 is removably journaled on a short roller-spindle 96, projected upwardly from a bracket-plate 97, secured to the front side of a frame or stand 1, and said spindle 96 is in precise vertical alignment with the cutter-spindle 5, so that the rounding out of all the blanks will be alike and perfectly even. The rollers 95 are made in different sizes, as illustrated in Fig. 18 of the drawings, and may be larger, smaller, and of the same size as the rotary cutter 6, it being obvious that a pattern-roller smaller than the cutter 6 will provide for the cutting or rounding out of the blanks in a size smaller than the pattern-plate which revolves against such roller, and vice versa. Therefore, by reason of employing different sizes of rollers 95, different sizes of soles and heels may be rounded out in the same shape as the pattern employed, while the adjustable connection of the blank-supporting table and the pattern to opposite ends of the vertical table-shaft provides for adjusting the machine to cut different lengths of soles with a single pattern.

The operation described is effected by means of a weight-arm 98. The weight-arm 98 is pivoted at its lower end, as at 99, to the frame or stand 1, and carries thereon an adjustable weight 100, and at an intermediate point above its pivot the said weight-arm has pivotally connected thereto at 101 one end of the pull-arm 102, which is provided at its other end with a hook 103, adapted to engage an eye 104, attached to the inner side of the swinging side arm 22. These weight connections yieldingly hold the swinging side arm to a position that causes the pattern-plate to bear against the periphery of the roller 95, and the sole or heel blanks 59, that are held between the clamp-plates 77 and 78 against the rotary cutter 6. By disconnecting the arm 102 from the swinging side arm 22 and swinging the latter and the clamp 75 back out of the way the machine may be used for buffing, scouring, and other purposes by attaching the proper cutter or tool to the spindle 5. It is to be further noted at this point that by reason of pivotally connecting the weight-arm 98 at its lower end to the frame or stand 1, said weight-arm, when swung to a position at one side of its point of pivot, as illustrated in Fig. 2 of the drawings, will yieldingly hold the swinging side arm to a position that causes the blanks 59 to be held against the rotary cutter. When the swinging weight-arm is swung inward to an opposite position at one side of its pivot, the same will hold the swinging side arm in a position with the blanks and pattern out of contact with the cutter and pattern-roller, respectively, and by reason of these functions of the weight-arm it is not necessary for the operator to hold the same in either of the positions noted, as is necessary in other similar machines.

In order that a single pattern-plate will provide for shaping any size and style of sole or heel, the pattern-plate 85 is provided at the toe and heel thereof with the opposite pairs of toe and heel pattern-plates 105. The plates 105 are pivotally connected at their outer ends on the stud-pins 106, that project through the longitudinally-disposed guide-slots 107, that serve to limit the longitudinal adjustment of the said plates, and at their other inner ends the plates 105 of each pair have pivotally connected thereto one end of the adjusting-links 108, the other ends of which are pivotally connected to the pattern-plate 85 on the single pivot-screw 109. By adjusting the plates 105 backward and forward a length adjustment will be secured, as well as any desired width adjustment, and the same may be held clamped in any adjusted position by means of the clamp-screws 110, engaging a threaded opening in the pattern-plate between the toe and heel plates and working on a washer 111, clamping onto the inner edges of said plates, it, of course, being understood that the outer edges of said plates are rounded to a configuration substantially agreeing with that of an ordinary shoe-sole.

Figure 19:
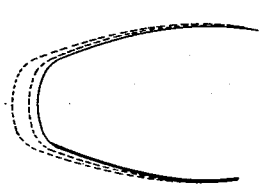
Figure 20:
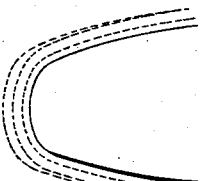
Figure 21:
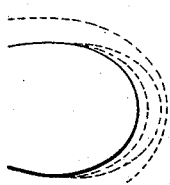
Figure 22:
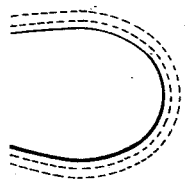
Figure 23:
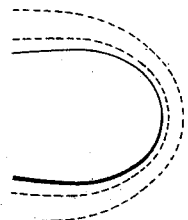
Figure 24:
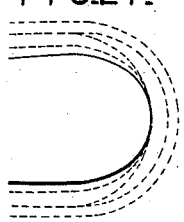
Figure 25:
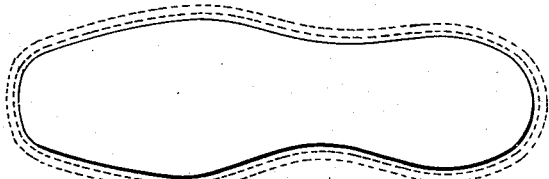

In providing for the adjustment of the heel-plates of the pattern slight modifications may be observed for spreading the same, as illustrated in Figs. 10 and 11 of the drawings, in which the inner ends of said heel-plates are shown as provided with the angularly-disposed slots 112, working over the screws or pins 113, secured in the pattern-plate 85. By reason of the great variety of adjustments for the pattern, as described, it will be obvious at a glance to those skilled in the art that a single pattern may be employed to make any shape, size, and style of sole and heel, as is illustrated in Figs. 19 to 25, inclusive. In Fig. 19 it is illustrated how, by the proper adjustment of the pattern-plate and a corresponding adjustment of the table-rest, different lengths of soles of the same width may be rounded out, and by proper adjustment of the different adjustments for the pattern-plates it will be understood that different lengths of soles of different or uniform widths and heels of different widths and lengths, the same width and different lengths, and vice versa, may be made, as shown in Figs. 20 to 25.

Although the pattern-plate 85, including the heel, may be used for the rounding out of the heel when the table-shaft is given a half-revolution in the manner described, a heel pattern-plate 114 may be used, if required, especially in rounding or finishing off a heel that is built up on a shoe, as illustrated in Fig. 15 of the drawings. In this figure of the drawings a shoe-clamp 115 is shown supported on the adjustable table-rest 55ª. The clamp 115, comprises a base-plate 116, secured on the table 55ª and provided in its upper side with the dovetailed groove 117, adapted to receive the dovetailed tongues 118 at the lower ends of the inwardly-curved clamp-jaws 119, having upper curved edges 120, adapted to snugly embrace the opposite sides of the shoe to hold the same properly in position for turning the heel against the cutter, any form of which may be employed. The opposed clamp-jaws 119 are provided therein with the threaded openings 121, in which work respectively the separate reversely-threaded portions 122 of the adjusting-screw 123, mounted to turn in a central bearing-lug 124 between the jaws, and carrying a hand-wheel 125 at one end to provide for adjusting the clamps. When the shoe-clamp 115 is employed, the edge-clamp 75 and the main clamp for the shoe or heel blank are removed from the machine.

Besides a separate heel pattern-plate 114, as illustrated in Fig. 12, a stiffening pattern-plate 126 may be attached to the lower end of the vertical table-shaft, and provides means for cutting or rounding out the leather stiffening for the inside of the heel of a shoe into the proper size and shape, as will be readily understood.

In order to properly set up the blanks on the rest-table 55ª to secure a correspondence between the positions thereof and the position of the pattern-plate, an adjustable gage-frame 127 is employed. The adjustable gage-frame 127 is provided with an extensible sectional supporting-arm 128. The supporting-arm 128 comprises the separate members 129, adjustably connected together at the meeting ends by a slot-and-bolt connection 130, and said sectional arm 128 is squared at one end, as at 131, and is pivoted at such end to the pivot-arm 132, projected from the outer side of the side arm 22, and arranged to bear against the squared end 131 of the pivoted supporting-arm 128 is one end of the leaf-spring 133, secured fast at its other end to the said swinging side arm 22, so as to hold the supporting-arm in either a position swung toward or out from the said swinging side arm.

The extensible pivoted supporting-arm 128 of the gage-frame is provided at its outer swinging end with the bearing-collar 134, that loosely receives therein the self-adjusting upright gage-rod 135, provided at its upper and lower ends with the T-shaped gage-arms 136, extended from both sides thereof and adapted to contact with one side of the pattern-plate at the lower end of the table-shaft and with the similar side of the shoe or heel blanks, so that the latter may be accurately positioned on the table-rest with relation to the pattern. A supplemental gage-arm 137 is adjustably connected at its inner end at 138 to one side of the supporting-arm 128 near the outer swinging end thereof, and said arm 137 is provided at its outer end with the upwardly and downwardly extending gage-bar 139, the upper and lower ends of which are adapted to respectively contact with one end of the blanks and one end of the pattern, and by means of the gage-frame just described having side and end gages the blanks can be correctly positioned on the table, so that the rounding out thereof will correspond with the pattern.

From the above it will be apparent that by reason of making provision for a half and complete revolution of the table-shaft in connection with the adjustable-pattern feature of the herein-described machine different sizes, shapes, and styles of soles, half-soles, and heels may be rounded out with the greatest facility, and other important advantages will readily appear to those skilled in the art. At this point attention is directed to the fact that in using the pattern-plate 126, employed for rounding out the leather stiffening for the inside of a heel of a shoe, the herein-described machine may be adapted for completing said stiffening, which ordinarily has to be finished in a separate machine after being rounded out. It is of course understood that the proper shape is given to this stiffening by the pattern-plate 126, and by placing the proper tool on the lower end of the cutter-spindle, so as to operate upon one face as well as the edge of the blank from which the stiffening is being rounded out, such stiffening may be thinned or tapered off to one edge as is necessary to provide a proper fit for the same in the heel of the shoe.

Further attention is directed to the pivoted weight-arm 98 and its connection with the swinging side arm carrying the table-shaft. It will be noted that by reason of the disposition of such weight-arm with its lower end pivoted to the supporting frame or stand, when the same is thrown at one side of the center it will pull the side arm to a position to hold the blanks against the cutter, while on the other hand when thrown to the opposite side of the center it will hold the side arm in a position away from the front side of the supporting frame or stand and away from the cutter, so as to dispense with supplemental levers for moving and holding the side arm in and out of operative position.

Other advantages than those stated will be readily understood by those skilled in the art, and it will be understood that changes in the form, proportion, and minor details of construction may be resorted to without departing from the principle or sacrificing any of the advantages of this invention.

Having thus described the invention, what is claimed, and desired to be secured by Letters Patent, is—

1. In a cutting or rounding machine for soles and heels, the combination of a fixedly positioned rotary cutter, a pattern roller removably supported in axial alignment with and below the cutter, a vertically arranged table shaft, a rest table for blanks adjustably mounted on the upper end of said table shaft, said rest table being adapted to be adjusted independently of the shaft and at right angles thereto, a pattern plate connected to the end of the table shaft opposite the rest table for blanks and having a corresponding adjustment to said rest table independently of and at right angles to the length of the table shaft, and an adjustable gage frame adapted to contact with the pattern plate and the blanks on the rest table to align the same, substantially as set forth.

2. In a rounding machine for soles and heels, the combination with the frame or stand and the rotary cutter; of a swinging side arm pivotally connected at one end to said frame or stand, the vertical table shaft journaled at the free end of the side arm and carrying a rest table at its upper end and a pattern plate at its lower end, the pattern roller supported in axial alignment with the cutter, separate gear wheels mounted on said table shaft, and a combined gear and lock device adapted to connect with either of said wheels to provide for a complete or half revolution thereof, substantially as set forth.

3. In a rounding machine for soles and heels, the combination with the frame or stand and the rotary cutter; of a swinging side arm supported at one side of said frame or stand, a vertical table shaft journaled at the free end of said side arm and carrying a rest table at one end and a pattern plate at the opposite end, interchangeable pattern rollers, separate worm gear wheels adjustably mounted on said table shaft to turn therewith, one of said wheels being provided with diametrically opposite lock notches and the other of said wheels being provided with a lock notch at one point, a worm shaft adjustably supported at one side of said side arm to engage either of said worm gear wheels, and a spring handle arm connected with said worm shaft and having a lock point or stud adapted to normally engage the lock notches of either one of said worm gear wheels when said worm shaft is held out of gear therewith, substantially as set forth.

4. In a rounding machine for soles and heels, the combination with the frame or stand and the rotary cutter; of a swinging side arm supported at one side of the frame or stand, the vertical table shaft journaled at the free end of said side arm and carrying a rest table and a pattern, separate worm gear wheels adjustably mounted on said table shaft, one of said wheels being provided with diametrically opposite lock notches and the other wheel being provided with a similar notch at one point, a short operating shaft journaled in fixed bearings at one side of the side arm, an adjustable worm shaft universally jointed at one end to said operating shaft and provided at its other end with a worm adapted to engage either of said worm wheels, a spring handle arm attached at one end to the said side arm and provided with a lock point or stud adapted to normally engage the lock notches of either of said worm wheels, and a link bar connecting said spring handle arm and said worm shaft, substantially as set forth.

5. In a rounding machine for soles and heels, the combination of the frame or stand having off-standing bracket arms projected from the front side thereof, the rotary cutter, a swinging side arm provided at one end with opposed pivot collars provided with bearing openings or perforations therein, a combined drive and pivot shaft journaled in the bearing openings or perforations of said pivot collars and provided with pointed pivot sockets at its upper and lower ends, pointed pivot screws arranged to work in said off-standing bracket arms and to engage in the pointed pivot sockets of said shaft to pivotally support one end of said swinging side arm, the table shaft journaled at the other free end of said side arm and carrying a table for blanks and a pattern, and gearing connections between said combined drive and pivot shaft and said table shaft, substantially as set forth.

6. In a rounding machine for soles and heels, the combination with the frame or stand, and the rotary cutter; of the side arm pivotally supported at one side of the frame or stand, the pattern roller, a vertical table shaft mounted at the swinging end of the side arm and provided at its upper and lower ends with right angularly disposed grooved head plates, a rest table having a tongue adjustably sliding in the groove of the head plate at the upper end of the shaft, a stud plate having a tongue adjustably sliding in the groove of the head plate at the lower end of the table shaft, and a pattern plate detachably fastened to said stud plate, substantially as set forth.

7. In a rounding machine for soles and heels, the combination with the frame or stand and the vertically arranged rotary cutter; of the swinging side arm, the pattern roller, a vertical table shaft journaled at the swinging end of said side arm and carrying a rest table at its upper end and at its lower end provided with a grooved head plate, a stud plate adjustably connected with said grooved head plate and provided with a depending attaching stud having a threaded opening and engaging pins at both sides of said opening, the pattern plate having a central screw opening and stud openings adapted to fit over said pins, and a clamping screw arranged to pass through the screw opening of the pattern plate and to engage the threaded opening of said stud, substantially as set forth.

8. In a rounding machine of the class described, the combination with the swinging support and the vertical table shaft journaled on said support and carrying a table at its upper end, of a clamp head mounted for a longitudinal adjustment on said support, a normally spring elevated clamp spindle arranged for support on said adjustable clamp head and carrying a clamp plate at its lower end disposed over said table, and an adjusting device mounted on said clamp head and connected with said clamp spindle, substantially as set forth.

9. In a rounding machine for soles and heels the combination with the swinging support having a tongue at its upper edge, and the vertical table shaft journaled at one end of said swinging support; of the adjustable clamp head fitted on the tongue of said swinging support and having a bracket arm adapted to extend over the table of said shaft, a normally spring elevated clamp spindle mounted in said bracket arm and carrying at its lower end a clamp plate, an adjustable clamp lever mounted on said clamp head and connected at one end with said clamp spindle, and an adjusting screw connected with the other end of said lever, substantially as set forth.

10. In a rounding machine for soles and heels, the combination with the frame or stand and the vertically disposed rotary cutter; of the vertical table shaft supported at one side of the frame or stand, and a segmental edge clamp adjustably supported in position at the front side of the rotary cutter above the plane of the upper end of the table shaft, substantially as set forth.

11. In a rounding machine for soles and heels, the combination with the frame or stand and a vertically disposed rotary cutter; of an adjustable table shaft carrying a table at its upper end, a clamp for blanks arranged above the table, and a swinging segmental edge clamp supported on the frame or stand at the front side of the rotary cutter above the table of said table shaft, substantially as set forth.

12. In a rounding machine for soles and heels the combination with the frame or stand and the vertically disposed rotary cutter therein; of the vertical adjustable table shaft carrying a table at its upper end, parallel supporting rods attached at their upper ends to the frame or stand at opposite sides of the rotary cutter, a pair of segmental clamp plates pivotally connected at one end to one of said rods and provided with hooks at the other end adapted to detachably engage the other of said rods, guide rods attached at their lower ends to the lower of said plates and passing through perforations in the upper plate, brace plates connected at one end to the upper ends of the guide rods and at their other ends to said supporting rods, one of said brace plates being provided with a hook at the end engaging one of said supporting rods, and clamp springs arranged on the guide rods between said brace plates and the upper clamp plate, substantially as set forth.

13. In a rounding machine for soles and heels, the combination with the vertical table shaft having a table at one end and a pattern at the other end, and a support for said shaft; of a gage frame comprising a sectional extensible supporting arm pivotally and adjustably connected at one end to the support for the table shaft and provided at its other end with a bearing collar, an upright gage rod mounted for a turning self-adjustment in said bearing collar and provided at its upper and lower ends above and below said supporting arm with T-shaped gage arms extending from both sides thereof, and a supplemental gage arm adjustably connected at its inner end to said supporting arm near the bearing collar and provided at its outer end with an upwardly and downwardly extending gage bar, substantially as set forth.

14. The herein-described pattern plate for sole and heel rounding machines provided in the toe and heel portions thereof with longitudinally disposed guide slots, opposite pairs of toe and heel plates arranged on the toe and heel portions thereof, stud pins pivotally connecting the outer ends of said plates and working in said slots, a pair of adjusting links pivotally connected at one end to the inner ends of said plates and at their other ends to a common pivot, and clamp screws arranged to work between the plates of each pair to clamp them in their adjusted positions, substantially as set forth.

In testimony that we claim the foregoing as our own we have hereto affixed our signatures in the presence of two witnesses.

FREDERICK W. KALLUSCH.
FREDERICK M. JURUICK.

Witnesses:
WILLIAM F. MORGAN,
WILLIAM F. KALLUSCH.